(12) United States Patent
Öhrlund et al.

(10) Patent No.: US 10,517,211 B2
(45) Date of Patent: Dec. 31, 2019

(54) ROBOTIC WORK TOOL WITH HUB-MOUNTED SKID PLATE

(71) Applicant: HUSQVARNA AB, Huskvarna (SE)

(72) Inventors: Magnus Öhrlund, Malmbäck (SE); Mats Svensson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 32 days.

(21) Appl. No.: 15/307,013

(22) PCT Filed: Apr. 29, 2014

(86) PCT No.: PCT/EP2014/058704
§ 371 (c)(1),
(2) Date: Oct. 27, 2016

(87) PCT Pub. No.: WO2015/165506
PCT Pub. Date: Nov. 5, 2015

(65) Prior Publication Data
US 2017/0042087 A1    Feb. 16, 2017

(51) Int. Cl.
*A01D 34/73*    (2006.01)
*A01D 34/74*    (2006.01)
(Continued)

(52) U.S. Cl.
CPC ......... *A01D 34/733* (2013.01); *A01D 34/008* (2013.01); *A01D 34/4166* (2013.01); *A01D 34/4167* (2013.01); *A01D 34/64* (2013.01); *A01D 34/74* (2013.01); *A01D 34/828* (2013.01); *A63B 47/021* (2013.01); *B60L 1/003* (2013.01); *B60L 3/0061* (2013.01); *B60L 8/003* (2013.01);
(Continued)

(58) Field of Classification Search
CPC .... A01D 34/416; A01D 34/4165–4167; A01D 34/661; A01D 34/665; A01D 34/733; A01D 34/728; A01D 34/74; A01D 34/828
See application file for complete search history.

(56) References Cited

U.S. PATENT DOCUMENTS

| 3,875,728 A | 4/1975 | Bacon |
| 4,161,820 A | 7/1979 | Moore |

(Continued)

FOREIGN PATENT DOCUMENTS

| CN | 203194166 U | 9/2013 |
| DE | 2707248 A1 | 8/1978 |

(Continued)

OTHER PUBLICATIONS

"Between Meaning in the Cambridge English Dictionary," accessed at http://dictionary.cambridge.org/dictionary/english/between, on Apr. 7, 2018, pp. 1-11.

(Continued)

*Primary Examiner* — Alicia Torres
(74) *Attorney, Agent, or Firm* — Burr & Forman LLP

(57) ABSTRACT

A robotic work tool system may include a robotic work tool. The robotic work tool may include a stationary hub and a rotatable shaft being supported by the hub. Also, a hub cover is releasably attached to the hub. The robotic work tool further includes a skid plate extending radially outwards from the hub cover and the skid plate is arranged between the hub and the hub cover.

19 Claims, 3 Drawing Sheets

(51) Int. Cl.

| | |
|---|---|
| *A01D 34/416* | (2006.01) |
| *A01D 34/00* | (2006.01) |
| *A01D 34/82* | (2006.01) |
| *A63B 47/02* | (2006.01) |
| *B60L 1/00* | (2006.01) |
| *B60L 3/00* | (2019.01) |
| *B60L 8/00* | (2006.01) |
| *B60L 15/20* | (2006.01) |
| *A01D 34/64* | (2006.01) |
| *B60L 53/16* | (2019.01) |
| *B60L 50/52* | (2019.01) |
| *B60L 50/60* | (2019.01) |
| *A01D 101/00* | (2006.01) |

(52) U.S. Cl.
CPC ............. *B60L 15/20* (2013.01); *B60L 50/52* (2019.02); *B60L 50/66* (2019.02); *B60L 53/16* (2019.02); *A01D 2101/00* (2013.01); *A47L 2201/022* (2013.01); *A47L 2201/04* (2013.01); *B60L 2200/40* (2013.01); *B60L 2240/36* (2013.01); *B60L 2240/421* (2013.01); *B60L 2260/32* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(56) References Cited

U.S. PATENT DOCUMENTS

| | | | | |
|---|---|---|---|---|
| 4,235,068 A | * | 11/1980 | Corner | A01D 34/416 56/12.7 |
| 4,268,964 A | * | 5/1981 | Moore | A01D 34/84 30/276 |
| 4,800,710 A | | 1/1989 | von Allwoerden et al. | |
| 4,852,811 A | | 8/1989 | Adams et al. | |
| 5,031,391 A | | 7/1991 | Meijering | |
| RE34,417 E | | 10/1993 | Werner et al. | |
| 5,916,111 A | | 6/1999 | Colens | |
| 6,032,369 A | * | 3/2000 | Tada | A01D 34/90 30/276 |
| 6,065,214 A | * | 5/2000 | Nagashima | A01D 34/6812 30/276 |
| 7,661,252 B2 | * | 2/2010 | Kitamura | A01D 34/4166 56/12.7 |
| 2012/0198706 A1 | | 8/2012 | Yang | |

FOREIGN PATENT DOCUMENTS

| | | |
|---|---|---|
| DE | 3316204 A1 | 11/1984 |
| DE | 3622855 A1 | 1/1988 |
| DE | 1021496 A1 | 1/1992 |
| DE | 19630178 A1 | 2/1998 |
| EP | 0272385 A1 | 6/1988 |
| EP | 2412219 A1 | 2/2012 |
| FR | 1440406 A | 5/1966 |
| GB | 1507432 A | 4/1978 |
| JP | 5027461 B2 | 9/2012 |
| KR | 10-1078824 B1 | 11/2011 |
| KR | 101172218 B1 | 8/2012 |
| NL | 7805129 A | 11/1979 |

OTHER PUBLICATIONS

"Define Between at Dictionary.com," accessed at http://dictionary.com/browse/between, on Apr. 7, 2018, pp. 1-9.

International Search Report and Written Opinion for International Application No. PCT/EP2014/058704 dated Jan. 20, 2015.

International Preliminary Report on Patentability for International Application No. PCT/EP2014/058704 dated Nov. 1, 2016.

* cited by examiner

ROBOTIC WORK TOOL WITH HUB-MOUNTED SKID PLATE

TECHNICAL FIELD

This application relates to a robotic work tool system for improved operation, and in particular to a robotic work tool system for improved robustness and increased operating time.

BACKGROUND

Robotic work tools, such as lawnmowers and in particular automatic lawnmowers, may be provided with a skid plate for protecting critical components arranged on the underside of the robotic work tool. For example, during operation rotating cutting discs may cause rocks present in the ground to accelerate upwards, and towards expensive parts arranged within the mower such as reduction gears, motors, etc. Other work tools being suspended by means of shock absorbers or similar may allow the underside of the work tool to come into contact with the ground e.g. when passing obstacles.

The skid plate is for this purpose provided on the underside of the work tool, forming a protective cover for the work tool. The skid plate is normally manufactured by a non-abrasive material in order to withstand impact from various objects present in the operating area of the work tool.

It is known to attach the skid plate to the underside via a hub, whereby the skid plate covers the hub and extends radially outwards from the hub. The hub also forms a fixed support to a rotatable cutting disc of the work tool; since the rotatable cutting disc extends radially out from a driven rotational shaft, the driven shaft is supported by the skid plate hub by means of two bearings.

Hence the skid plate hub is stationary, while the driven shaft is allowed to rotate relative the skid plate hub due to the provision of the two bearings.

The skid plate is attached to the hub by means of a number of screws, being insertable into associated threaded recesses of the hub for securing the position of the skid plate. The screws must be inserted into the hub, thus significantly reducing the available space for the bearings. A certain axial distance between the two bearings is often necessary in order to ensure sufficient life time of the bearings as well as a reduced noise level. The surrounding environment for the cutting equipment is very tough with grass, dust and water. To increase the lifetime of the bearings, it is important to seal the space around the bearings.

There is thus a need for a robotic work tool system that is able to overcome the above mentioned disadvantages.

SUMMARY

It is an object of the teachings of this application to overcome the problems listed above by providing robotic work tool system comprising a robotic work tool. The robotic work tool comprises a stationary hub and a rotatable shaft being supported by the hub, and a hub cover being releasably attached to the hub. The robotic work tool further comprises a skid plate extending radially outwards from the hub cover, wherein the skid plate is arranged between the hub and the hub cover.

It is thus possible to attach the skid plate by a clamping action provided by urging the hub cover against the hub. Means for securing the hub cover relative the hub may be provided radially outside the rotatable shaft whereby increased space will be available for bearings between the rotatable shaft and the stationary hub.

In one embodiment the robotic work tool is a robotic lawnmower. In one embodiment the robotic work tool is a farming equipment. In one embodiment the robotic work tool is a golf ball collecting tool. The robotic work tool may also be a vacuum cleaner, a floor cleaner, a street sweeper, a snow removal tool, a mine clearance robot or any other robotic work tool that is required to operate in a work area in a methodical and systematic or position oriented manner.

It is also an object of the teachings of this application to overcome the problems listed above by providing a robotic work tool arranged as above.

It is also an object of the teachings of this application to overcome the problems listed above by providing method for use in a robotic work tool system having a stationary hub and a rotatable shaft being supported by the hub. The method comprises the steps of arranging a skid plate onto said hub, and attaching a hub cover to the hub whereby the skid plate extends radially outwards from the hub cover.

The inventors of the present invention have realized, after inventive and insightful reasoning, that a robotic work tool having a skid plate which is attached to a hub by means of a hub cover will increase the life time of the robotic work tool since the hub cover may be constructed such that it protects the bearings of the rotational shaft from water and dirt in a very efficient manner.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
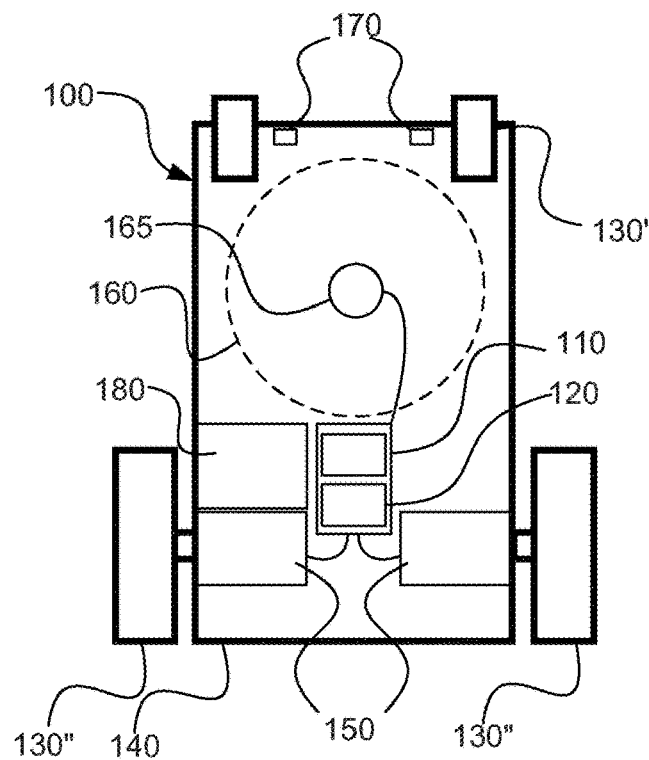
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 is configured to read instructions from a memory 120 and execute these instructions to control the operation of the robotic work tool 100.

The robotic work tool 100 further has at least one sensor 170, in the example of FIG. 1 there are two sensors 170, arranged to detect a magnetic field (not shown). The sensors may detect the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165.

The robotic work tool 100 is, in one embodiment, a robotic lawnmower.

The robotic work tool 100 may also have (at least) one battery 180 for providing power to the motors 150 and the cutter motor 165. Connected to the battery 180 are two charging connectors for receiving a charging current from a charger (referenced 220 in FIG. 2) of the charging station (referenced 210 in FIG. 2).

Alternatively, the batteries may be solar charged.

Figure 2:
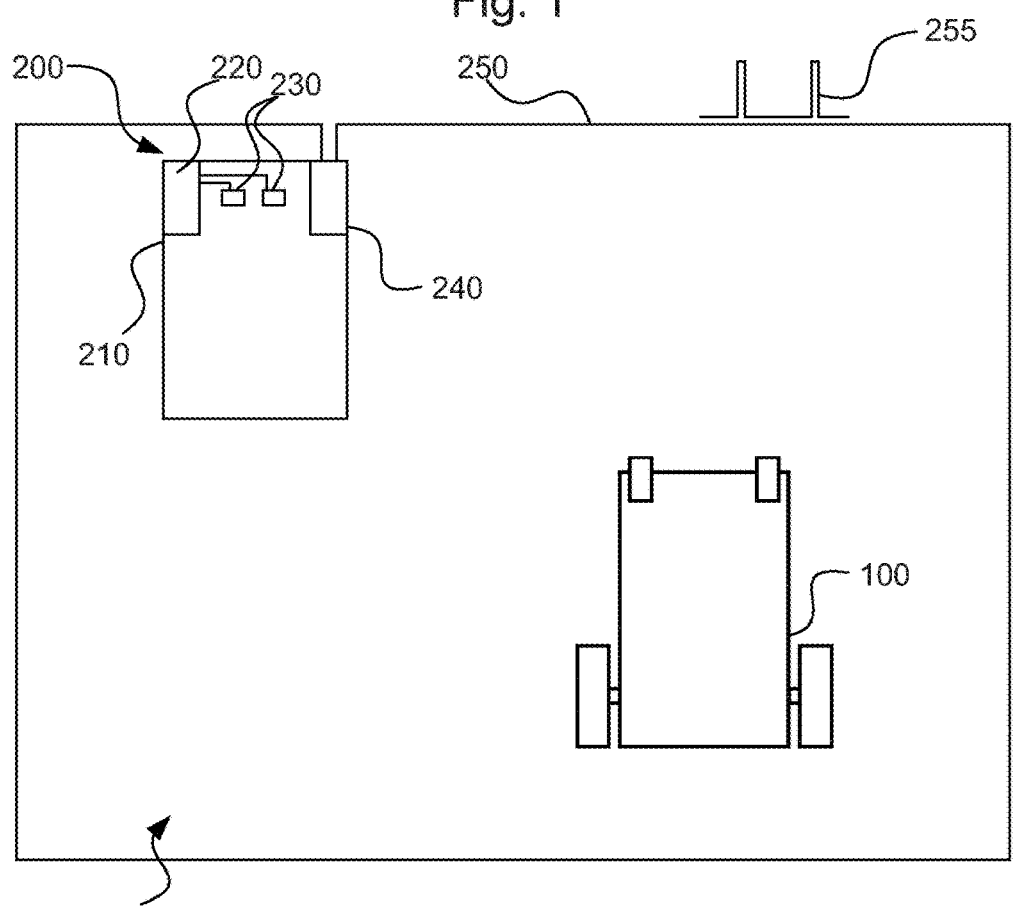
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200.

The robotic work tool 100 of FIG. 2 is a robotic work tool 100 such as disclosed with reference to FIG. 1. A charging station 210 has a charger 220 coupled to, in this embodiment, two charging connectors 230. The charging connectors 230 are arranged to co-operate with corresponding charging connectors 185 of the robotic work tool 100 for charging the battery 180 of the robotic work tool 100.

The charging station 210 also has, or may be coupled to, a signal generator 240 for providing a control signal 255 (for more details see FIG. 3) to be transmitted through the boundary wire 250. As is known in the art, the current pulses 255 will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed.

Figure 3:
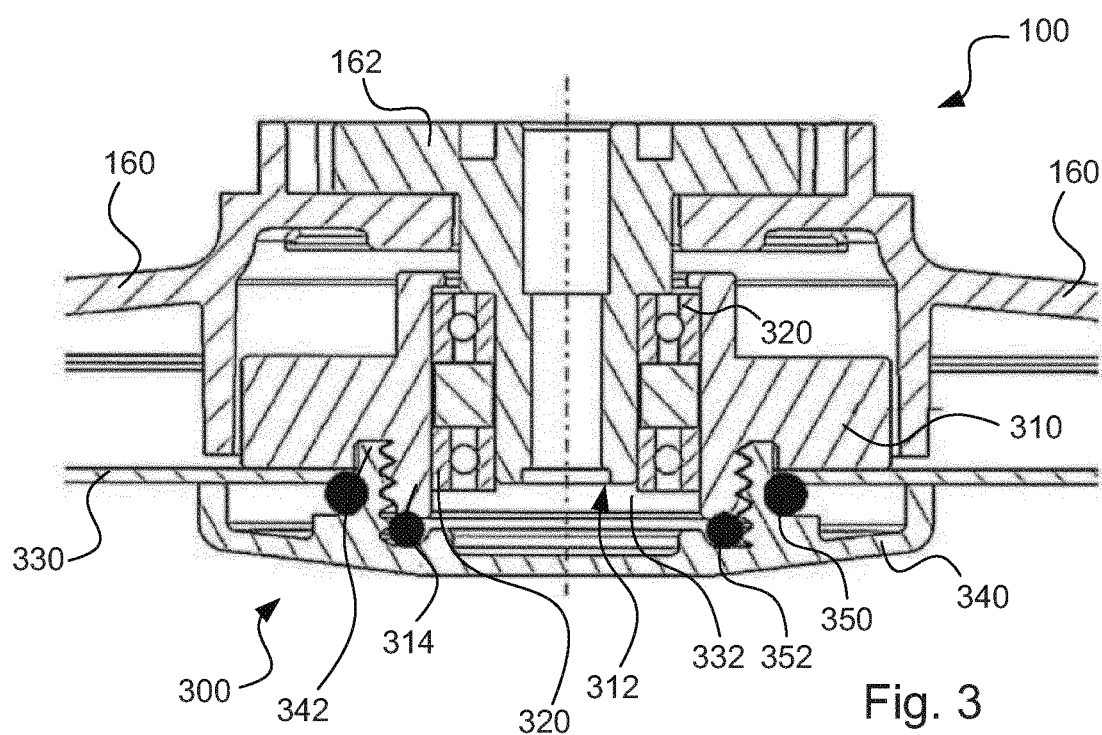
FIG. 3 is a cross-sectional view of parts of a robotic working tool according to one embodiment of the teachings of this application.

Now turning to FIG. 3 an embodiment of a robotic work tool 100 is shown in further detail. As already have been described the robotic work tool 100 has a work tool 160, which in FIG. 3 is represented as a rotating blade, or a cutting disc 160. The cutting disc 160 is securely attached to a rotating shaft 162 which is driven by the cutter motor 165.

In order to protect the underside of the robotic work tool 100 from damage, a skid plate arrangement 300 is provided. The rotational shaft 162 of the cutter motor 165 is supported by a stationary hub 310. The stationary hub 310 has a centrally arranged through hole 312 into which the rotational shaft 162 is inserted. Two bearings 320, in the form of ball bearings or roller bearings, are also provided for allowing the rotational shaft 162 to rotate with a minimum of vibration and/or frictional losses. The bearings 320 are spaced apart axially, i.e. in a direction being parallel with the longitudinal extension of the rotational shaft 162.

A skid plate 330 is clamped between the hub 310 and a hub cover 340. Starting with the skid plate 330, it is preferably provided as a sheet-like structure being made of a solid material being capable of withstanding mechanical impact. The skid plate 330 extends in a radial direction out from the hub 310. As can be seen in FIG. 3 the skid plate 330 has a circular cut-out 332 at its centre, such that it may be aligned with the hub 310 without covering the rotational shaft 162 or the bearings 320.

The hub cover 340 acts as a lid for the critical parts of the skid plate arrangement 300, i.e. the bearings 320. For this purpose the radial extension of the hub cover 340 is larger than the radial extension of the bearings 320. However, the embodiment shown in FIG. 3 encompasses that the radial extension of the hub cover 340 is also larger than the radial extension of the hub 310.

The hub 310 has a cylindrical portion 314 which extends downwards, i.e. towards the skid plate 330, and which is provided with threads. Correspondingly, the hub cover 340 has a cylindrical portion 342 which extends upwards, i.e. towards the skid plate 330, and which is provided with associated threads. The hub cover 340 may consequently be threaded onto the hub 310 as a twist and release nut.

In order to seal the critical components of the skid plate arrangement 300, i.e. the bearings 320, two O-rings 350, 352 are provided. A first O-ring 350 is arranged between the skid plate 330 and the hub cover 340. As the hub cover 340 is threaded onto the hub 310 the skid plate 330 will rest against the hub 310, i.e. the planar parts of the hub being arranged radially outside the threaded portion 314. Due to the provision of the O-ring 350 the skid plate 330 will be securely fixated in a sealed manner, thus preventing movement of the skid plate 330 as well as water or dust entering the area of the bearings 320.

An additional O-ring 352 is provided between the hub cover 340 and the hub 310 for ensuring a tight connection. In this particular embodiment the O-ring 352 is arranged adjacent to the threaded portion 314 of the hub 310.

The skid plate arrangement 300, comprising the hub 310, the skid plate 330, and the hub cover 340, allows for very fast operation e.g. in case of service or cutting disc 160 replacement. The hub cover 340 may easily be rotated such that it is released from the hub 310 whereby the skid plate 330 may be removed thus exposing the cutting disc 160. The cutting disc 160 may e.g. be attached to the rotational shaft 162 by means of screws, or other fasteners. The skid plate arrangement 300 is easily assembled onto the robotic work toll 100 by performing the same steps but in an opposite order.

Figure 4:
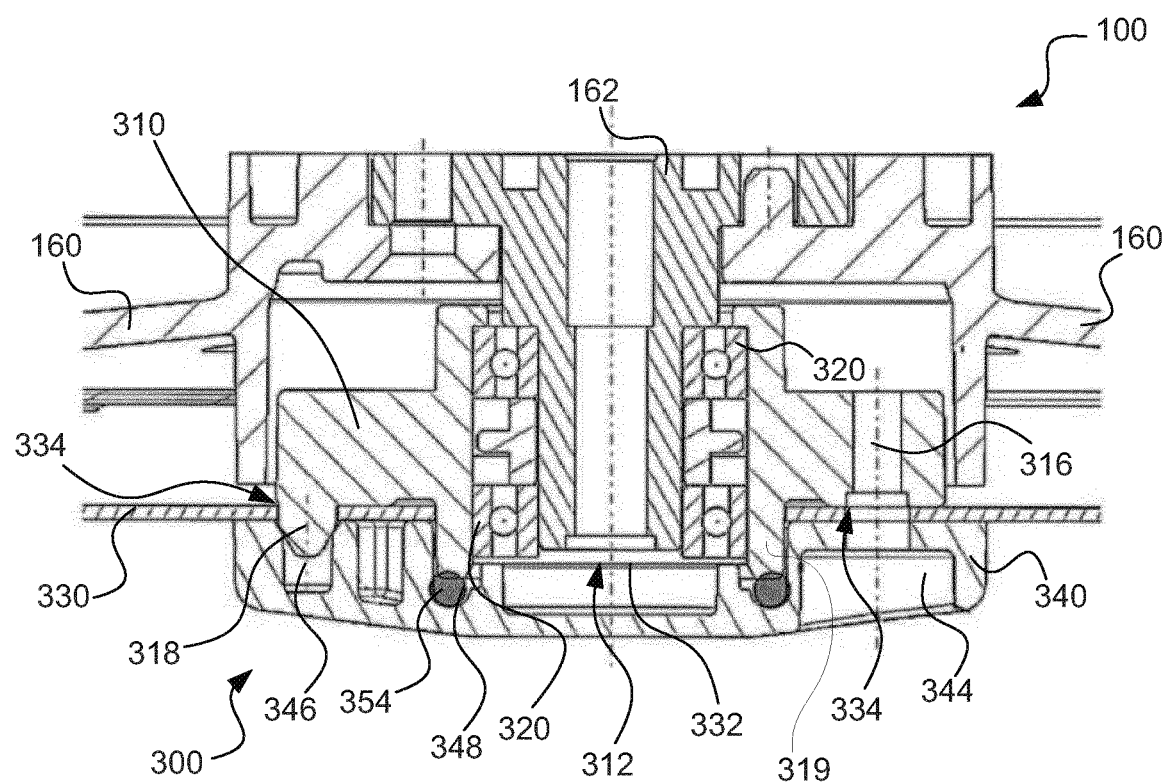
FIG. 4 is a cross-sectional view of parts of a robotic working tool according to another embodiment of the teachings of this application.

Now turning to FIG. 4 another embodiment of a robotic work tool 100 is shown. As already have been described with reference to FIG. 3 the robotic work tool 100 comprises a work tool 160 in the form of a rotating cutting disc 160 being attached to a rotating shaft 162. The rotating shaft 162 is driven by a cutter motor 165 (see FIG. 1).

A skid plate arrangement 300 is also provided, comprising a hub 310, a skid plate 330, and a hub cover 340. The rotational shaft 162 is supported by the stationary hub 310 having a centrally arranged through hole 312 into which the rotational shaft 162 is inserted. Two bearings 320, in the form of ball bearings or roller bearings, are also provided in the same manner as shown in FIG. 3.

The skid plate 330 is clamped between the hub 310 and the hub cover 340 and it extends in a radial direction out from the hub 310. The skid plate 330 has a circular cut-out 332 at its centre, such that it may be aligned with the hub 310 without covering the rotational shaft 162 or the bearings 320.

As is shown in FIG. 4 the hub cover 340 is attached to the hub 310 by means of screws. The hub 310 comprises two or more recesses 316 which form cylindrical bores having threads on its inner surface. The recesses 316 are preferably spaced apart circumferentially, e.g. by 180° in case of two recesses 316, 120° in case of three recesses 316, and 72° in case of five recesses 316. The hub cover 340 is provided with corresponding bores 344 for allowing screws to extend through the hub cover 340 while the screw head is supported.

In order to facilitate mounting of the skid plate arrangement 300, and also for forming a more robust connection between the hub 310 and the hub cover 340, the hub 310 is provided with at least one guiding pin 318 for insertion into a corresponding recess 346 of the hub cover 340. It should be realized that the guiding pin(s) 318 could very well be provided on the hub cover 340, thus requiring that the hub 310 shows corresponding recesses 346.

In one embodiment, each guiding pin 318 is provided circumferentially between two adjacent screw bores 316.

As can be seen in FIG. 4 the skid plate 330 is provided with several cut outs 334 allowing the screws and the guiding pins 318 to extend through the skid plate 330.

Further to this the hub cover 340 comprises a circular groove 348, and the hub 310 comprises a circular ridge 319 for insertion into the circular groove 348. In a preferred embodiment an O-ring 354 is provided in the groove 348, thus forming a sealing when the ridge 319 of the hub 310 is pressed against the O-ring 354 upon tightening of the screws.

Figure 5:
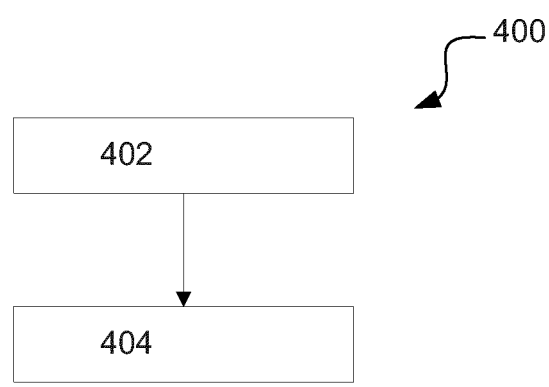
FIG. 5 shows a method according to an embodiment of the teachings of this application.

Now turning to FIG. 5 a method 400 for use in a robotic work tool system will be described. The robotic work tool system comprises a robotic work tool having a stationary hub 310 and a rotatable shaft 162 being supported by the hub 310. The method 400 comprises a first step 402 of arranging a skid plate 330 onto the hub 310, and a second step 404 of attaching a hub cover 340 to the hub 310 whereby the skid plate 330 extends radially outwards from the hub cover 340. Step 404 will thus cause a clamping action on the skid plate 330 such that it is securely fixated to the robotic work tool.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool, said robotic work tool comprising:
    a stationary hub and a rotatable shaft being supported by the hub, and
    a hub cover being releasably attached to the hub,
    wherein the robotic work tool further comprises a skid plate extending radially outwards from the hub cover,
    wherein the skid plate is arranged between the hub and the hub cover,
    wherein at least a portion of the hub passes through a plane in which the skid plate lies,
    wherein the hub cover maintains a fixed position relative to the skid plate and the hub when the hub cover is attached to the hub; and
    wherein the hub cover is also directly attached to the hub.

2. The robotic work tool system according to claim 1, wherein the rotatable shaft is supported by the hub by at least two bearings.

3. The robotic work tool system according to claim 2, wherein the at least two bearings are spaced apart in an axial direction.

4. The robotic work tool system according to claim 1, further comprising a cutting disc being fixedly attached to the rotatable shaft.

5. The robotic work tool system according to claim 1, wherein a radius of the hub cover is greater than a radius of the hub.

6. The robotic work tool system according to claim 1, wherein the hub cover is attached to the hub by at least two screws.

7. The robotic work tool system according to claim 6, wherein one of the hub cover or the hub comprises at least one guiding pin, and wherein the other one of said hub cover or hub comprises at least one corresponding recess for accommodating the guiding pin.

8. The robotic work tool system according to claim 6, wherein one of the hub cover or the hub comprises a circular groove, and wherein the other one of said hub cover or hub comprises a circular ridge for insertion into the circular groove.

9. The robotic work tool system according to claim 8, further comprising an O-ring being arranged within said circular groove.

10. The robotic work tool system according to claim 7, wherein the guiding pin and/or at least one of the screws extends through the skid plate.

11. The robotic work tool system according to claim 1, wherein the hub cover is threaded onto the hub.

12. The robotic work tool system according to claim 11, further comprising an O-ring being arranged between the hub cover and the hub.

13. The robotic work tool system according to claim 12, further comprising an O-ring being arranged between the hub cover and the skid plate.

14. The robotic work tool system of claim 1, wherein said robotic work tool is a robotic lawnmower.

15. A robotic work tool comprising:
    a stationary hub and a rotatable shaft being supported by the hub, and
    a hub cover being releasably attached to the hub,
    wherein the robotic work tool further comprises a skid plate extending radially outwards from the hub cover, wherein the skid plate is arranged between the hub and the hub cover, wherein at least a portion of the hub passes through a plane in which the skid plate lies, wherein the skid plate is attached by a clamping action provided by the hub cover being urged against the hub such that the hub cover maintains a fixed position relative to the skid plate and the hub when the hub cover is attached to the hub, and wherein the hub cover is also directly attached to the hub.

16. A method for use in a robotic work tool system having a stationary hub and a rotatable shaft being supported by the hub, comprising the steps of:

arranging a skid plate onto said hub, and attaching a hub cover to the hub whereby the skid plate extends radially outwards from the hub cover such that at least a portion of the hub passes through a plane in which the skid plate lies and the hub cover maintains a fixed position relative to the skid plate and the hub, and wherein the hub cover is also directly attached to the hub.

17. The robotic work tool system according to claim 1, wherein the skid plate is attached by a clamping action provided by the hub cover being urged against the hub.

18. The robotic work tool system according to claim 17, wherein one of the hub cover or the hub comprises at least one guiding pin, and wherein the other one of said hub cover or hub comprises at least one corresponding recess for accommodating the guiding pin; and wherein the guiding pin extends through the skid plate.

19. The robotic work tool system according to claim 1, wherein one of the hub cover or the hub comprises at least one guiding pin, and wherein the other one of said hub cover or hub comprises at least one corresponding recess for accommodating the guiding pin.

* * * * *